United States Patent [19]

Scheiner et al.

[11] 3,764,650

[45] Oct. 9, 1973

[54] RECOVERY OF GOLD FROM ORES

[75] Inventors: Bernard J. Scheiner, Sparks; Roald E. Lindstrom, Reno, both of Nev.

[73] Assignee: The United States of America as represented by the Secretary of Interior, Washington, D.C.

[22] Filed: Dec. 31, 1970

[21] Appl. No.: 103,286

[52] U.S. Cl. .................................. 423/38, 75/118
[51] Int. Cl. ... C01g 7/00, C22b 11/06, C22b 11/04
[58] Field of Search ...................... 23/367; 75/118; 423/38

[56] References Cited
UNITED STATES PATENTS

| | | | |
|---|---|---|---|
| 732,641 | 6/1903 | Joseph | 75/101 R |
| 971,252 | 9/1910 | Clancy | 75/101 R |
| 3,545,964 | 12/1970 | Hansen et al. | 75/118 |
| 738,758 | 9/1903 | De Alzugaray | 75/101 R |
| 984,090 | 2/1911 | Jones et al. | 75/118 X |
| 3,574,600 | 4/1971 | Scheiner et al. | 75/118 |

FOREIGN PATENTS OR APPLICATIONS

| 25,672 | 10/1906 | Great Britain | 75/118 |
|---|---|---|---|

OTHER PUBLICATIONS

Mellor, "Comprehensive Treatise On Inorganic And Theoretical Chemistry," Vol. III, Page 528(1923).
Sneed et al., "Comprehensive Inorganic Chemistry," Vol. II Pages 214–215 (1954)

*Primary Examiner*—M. Weissman
*Attorney*—Ernest S. Cohen and William S. Brown

[57] ABSTRACT

Gold is recovered from ores by slurrying the ores with an acid-salt mixture and treating the slurry with ozone, whereby the gold is extracted in the form of a chloride complex.

3 Claims, No Drawings

RECOVERY OF GOLD FROM ORES

Acid-chloride systems have been used previously for extraction of gold from ores. For example, chlorine and acid, bleaching powder and acid and oxidizing systems such as potassium permanganate-salt-acid have been used. These processes were based on the dissolution of the gold as gold trichloride, the trichloride further reacting in acidic media to form the tetrachloro complex, $HAuCl_4$. In all of these processes, however, the reagents were not selective for gold only, but reacted with ferrous sulfides, magnesia, pyrite and carbonaceous material. Furthermore, the reagents were not effective in destroying refractory materials in the ores and were, therefore, inefficient in dissolution of the gold. As a result, roasting prior to extraction was often necessary to obtain satisfactory gold recovery.

It has now been found that these difficulties of the prior art process are largely overcome and an efficient extraction of gold from its ores obtained by treatment of an acidic aqueous slurry of the ore and a chloride salt with ozone.

Any of the ores commonly used as sources of gold may be used in the process of the invention. These include oxidized, reducing and carbonaceous ores. The invention has, in fact, been found to be especially effective in treatment of ores such as carbonaceous and arseno pyrite ores, which are not amenable to conventional treatment. The ore is initially ground, or otherwise reduced, to a particle size of about 65 to 200 mesh. It is then mixed with about 35 to 50 percent by weight of water and sufficient salt to provide a chloride concentration of about 5 to 20, expressed as weight percent of sodium chloride, in the resulting slurry. The preferred salt, for reasons of efficiency and economy, is sodium chloride. However, any water soluble salt capable of yielding the required chloride concentration may be used. Other suitable salts include potassium chloride, calcium chloride, magnesium chloride, etc. Where sodium chloride is used, a concentration of about 5 to 20 percent by weight is generally suitable. However, the optimum concentrations of sodium chloride, as well as chloride concentration and other variables discussed below, may vary considerably depending on the type of ore treated and are best determined experimentally.

Sufficient mineral acid is then added to the slurry to provide a pH of about 0.5 to 1.8, preferably about 1. The preferred acid is sulfuric, but hydrochloric or nitric acids may also be used. Ozone is then bubbled through the slurry for a period of about 4 to 16 hours, with ozone consumption corresponding to about 20 to 40 pounds per ton of ore. Temperature of the slurry during the ozone treatment should be about 10° to 30°C, preferably about 23° to 25°C. Atmospheric pressure is usually satisfactory, but a modest increase in pressure, e.g., 10 to 15 pounds, may be used where particle sizes are small, thereby requiring less agitation of the slurry during the ozone treatment.

The following examples will serve to more particularly illustrate the invention.

EXAMPLE 1

An oxidized ore (100 g) containing 0.4 oz/ton gold was slurried with 10 g of NaCl in 200 milliliters of water. Sulfuric acid was added until a pH of one was obtained. Ozone was bubbled through the solution for 8 hours. Gold extraction was 95 percent.

EXAMPLE 2

A carbonaceous ore (50 g) containing 0.23 oz/ton gold and 0.4 percent organic carbon and 5 g NaCl was slurried with 100 milliliters of water. Sulfuric acid was added until a pH of one was obtained. Ozone was bubbled through the solution for 5 hours. Gold extraction was 92 percent. This same ore when treated by conventional cyanidation yields only 32 percent gold extraction.

Experiments have also shown that reuse of the acid-chloride solution with fresh ore gives good extractions as long as the chloride concentration remains high.

What is claimed is:

1. A method for extracting gold from ores consisting essentially of forming an aqueous slurry of the ore containing a water soluble chloride salt in a concentration sufficient to provide a chloride concentration of about 5 to 20 weight percent, expressed as sodium chloride, and sufficient mineral acid to provide a pH of about 0.5 to 1.8, and contacting the slurry with ozone for a period of about 4 to 16 hours at a temperature of about 10° to 30°C.

2. The method of claim 1 in which the chloride salt is sodium chloride.

3. The method of claim 1 in which the mineral acid is sulfuric acid.

* * * * *